(12) United States Patent
Sohn

(10) Patent No.: US 8,632,923 B2
(45) Date of Patent: Jan. 21, 2014

(54) BATTERY PACK

(75) Inventor: Kwon Sohn, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 169 days.

(21) Appl. No.: 13/163,252

(22) Filed: Jun. 17, 2011

(65) Prior Publication Data

US 2012/0003521 A1    Jan. 5, 2012

Related U.S. Application Data

(60) Provisional application No. 61/344,350, filed on Jul. 2, 2010.

(51) Int. Cl.
| | |
|---|---|
| *H01M 8/04* | (2006.01) |
| *B60H 1/00* | (2006.01) |
| *B60H 3/00* | (2006.01) |

(52) U.S. Cl.
USPC ............. 429/437; 429/433; 429/434; 165/41; 165/42; 165/43

(58) Field of Classification Search
None
See application file for complete search history.

(56) References Cited

U.S. PATENT DOCUMENTS

| | | |
|---|---|---|
| 4,585,712 A | 4/1986 | Wedlake |
| 5,725,049 A | 3/1998 | Swanson et al. |
| 6,010,800 A | 1/2000 | Stadnick et al. |
| 2005/0202310 A1 | 9/2005 | Yahnker et al. |
| 2006/0210868 A1 | 9/2006 | Kim et al. |
| 2008/0283223 A1* | 11/2008 | Chang et al. ............. 165/104.26 |

FOREIGN PATENT DOCUMENTS

| | | |
|---|---|---|
| DE | 2047787 | 11/1971 |
| DE | 19724020 A1 | 1/1998 |
| JP | 60-163386 A | 8/1985 |
| JP | 05-190213 A | 7/1993 |
| JP | 10-055827 * | 2/1998 |
| JP | 2006-269426 A | 10/2006 |
| JP | 2010-062130 | 3/2010 |
| KR | 10 2009-0062668 A | 6/2009 |
| KR | 10-2009-0114964 A | 11/2009 |

OTHER PUBLICATIONS

Machine translation of DE 19724020, retrieved from <http://world-wide.espacenet.com/?locale=EN_ep> on May 22, 2013.*
European Search Report in EP 11171500.9-2119, dated Oct. 10, 2011 (Sohn).
Japanese Office Action dated Dec. 25, 2012.
Korean Office Action in KR 10-2011-0061644, dated Aug. 22, 2012 (Sohn).
Japanese Notice of Allowance dated Apr. 16, 2013.

* cited by examiner

*Primary Examiner* — Cynthia K. Walls
(74) *Attorney, Agent, or Firm* — Lee & Morse, P.C.

(57) ABSTRACT

A battery pack includes at least one battery cell, an evaporator disposed adjacent the at least one battery cell in thermal communication therewith, the evaporator including porous media and a collector in communication with the porous media, and a coolant storage unit in incoming and outgoing fluid communication with the evaporator.

19 Claims, 3 Drawing Sheets

BATTERY PACK

CROSS-REFERENCE TO RELATED APPLICATION

The present application claims priority under 35 U.S.C. §119(e) to U.S. Provisional Application No. 61/344,350, filed on Jul. 2, 2010, and entitled: "Secondary Battery," which is incorporated herein by reference in its entirety.

BACKGROUND

1. Field

Embodiments relates to a battery pack.

2. Description of the Related Art

Secondary batteries, unlike primary batteries, are rechargeable. Low capacity secondary batteries are widely used in high-tech electronic devices such as cellular phones, notebook computers, and camcorders. High capacity secondary batteries are widely used as motor-driving power sources of electric vehicles or hybrid vehicles. The sizes of secondary batteries are limited due to limited installation spaces; however, secondary batteries having higher capacities are required. For this, it is necessary to stack more battery cells in a battery pack for increasing the battery capacity. In addition, since the lifespan and efficiency of battery cells are affected by the amount of heat generating from the battery cells, it is necessary to develop efficient heat dissipating methods.

SUMMARY

Embodiments are therefore directed to a battery pack, which substantially overcome one or more of the problems due to the limitations and disadvantages of the related art.

Embodiments may provide a battery pack, including at least one battery cell, an evaporator disposed adjacent the at least one battery cell in thermal communication therewith, the evaporator including porous media and a collector in communication with the porous media, and a coolant storage unit in incoming and outgoing fluid communication with the evaporator.

The coolant storage unit may be configured to store a liquid coolant to be supplied to the porous media and to receive coolant from the collector.

The evaporator may be disposed adjacent at least one side of the battery pack.

The evaporator may include a first port at which the coolant is received and a second port through which the coolant is discharged.

The storage unit may be a condenser.

The collector may be wider adjacent the second port than the first port.

The evaporator may extend along the bottom portion of the battery cell in a first direction.

The first and second port may be spaced apart along the evaporator in the first direction.

The evaporator may extend in a second direction, orthogonal to the first direction.

The evaporator may be longer in the second direction adjacent the second port than the first port.

The porous media may extend substantially a same length in the second direction along the first direction.

The collector may be further downward in the second direction adjacent the second port than adjacent the first port.

The battery pack may include a collection line providing fluid communication from the second port to the condenser and a supply line providing fluid communication from the condenser to the first port.

A diameter (d2) of the collection line may be larger than a diameter (d1) of the supply line. The diameter (d2) of the collection line may be between 1.5 to 2 times the diameter (d1) of the supply line.

The battery pack may include a check valve between the second port and the collection line.

The collector may be at a low pressure relative to the condenser.

The battery pack may include a housing for the battery cell, wherein the evaporator is disposed on at least one side of the housing and extends along the housing in a first direction.

The collector may include a collection region adjacent at least one side of the evaporator.

The storage unit may be adjacent a bottom of the evaporator.

The porous media may extend along the evaporator in the first direction between the storage unit and the collector.

The battery pack may include a heat sink adjacent at least one side of the evaporator.

The heat sink may include dissipating fins extending away from the evaporator.

The collection region may be adjacent a top of the evaporator.

The collector may include a hollow conduit extending parallel with the porous media, the hollow conduit being in fluid communication with the storage unit and the collection region.

The hollow conduit may be at a periphery of the evaporator in a second direction, orthogonal to the first direction.

The collector may include a check valve between the hollow conduit and the collection region.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a structure of a secondary battery will be described according to an embodiment.

Figure 1:
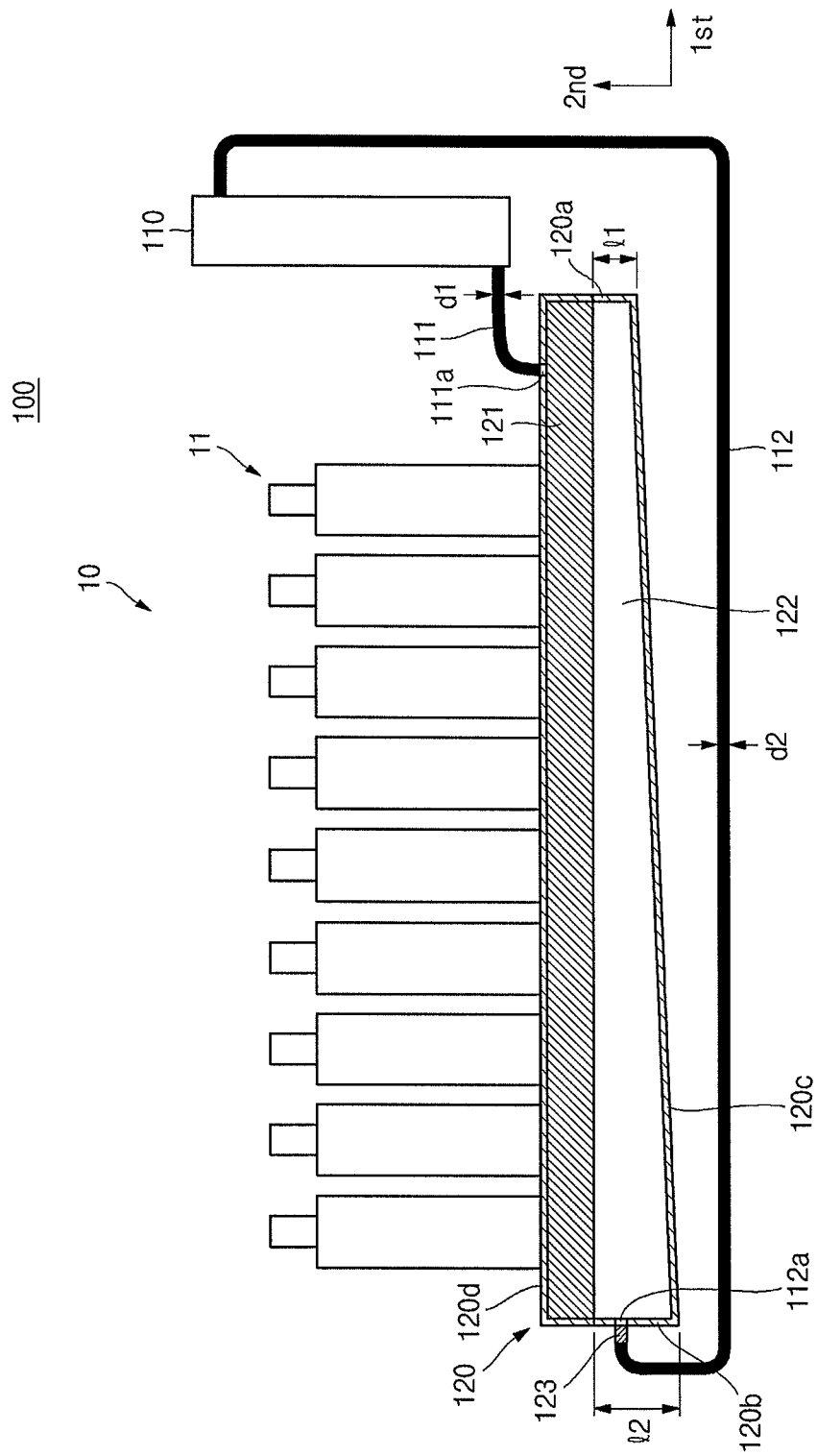
FIG. 1 illustrates a view of a structure of a secondary battery according to an embodiment.

FIG. 1 is a view illustrating a structure of a secondary battery 100 according to an embodiment. Referring to FIG. 1, the secondary battery 100 of the current embodiment includes a condenser 110 and an evaporator 120 attached to a surface of a battery pack 10.

The condenser 110 has an inner space filled with a refrigerant. The refrigerant in the condenser 110 is supplied to the evaporator 120 through a supply line 111 and a first port 111a in the evaporator 120. The refrigerant may be a material that is not environmentally harmful, e.g., pure water. The condenser 110 receives the refrigerant evaporated in the evaporator 120 through a second port 112a in the evaporator 120 and a collection line 112. In the condenser 110, the refrigerant is cooled while being compressed so that the refrigerant condenses into liquid phase. That is, the condenser 110 may supply the refrigerant to the battery pack 10 to cause the refrigerant to take heat from the battery pack 10 and evaporate into gas phase. Then, the condenser 110 may collect the gas-phase refrigerant and condense the refrigerant into liquid phase.

The diameter d2 of the collection line 112 is greater than the diameter d1 of the supply line 111. When the refrigerant passes through the collection line 112, the refrigerant is in gas phase, and thus the volume of the refrigerant is larger than the liquid-phase volume of the refrigerant. Thus, the diameter d2 of the collection line 112 is set to be greater then the diameter d1 of the supply line 111 for a smooth flow of the refrigerant. For example, the diameter d2 of the collection line 112 may be greater than the diameter d1 of the supply line 111 by a factor of about 1.5 to about 2. If the diameter d2 of the collection line 112 is about 1.5 or more times the diameter d1 of the supply line 111, the gas-phase refrigerant may flow to the condenser 110 smoothly. In addition, if the diameter d2 of the collection line 112 is about 2 or fewer times the diameter d1 of the supply line 111, the refrigerant may be easily moved by capillary action.

The evaporator 120 is connected to the condenser 110 through the supply line 111. The evaporator 120 cools the battery pack 10 using the refrigerant supplied through the supply line 111.

The evaporator 120 includes an upper wick 121 made of a porous medium, and a lower dense part 122 that can be kept in a vacuum state. The vacuum state of the dense part 122 may be maintained by the condenser 110.

If the dense part 122 is kept in a vacuum state, the boiling point of the refrigerant is lowered in the evaporator 120. In addition, the refrigerant is heated by heat generating from the battery pack 10. Therefore, the refrigerant is evaporated by the heat of the battery pack 10 and is stored in pores of the wick 121. Since the pores function as capillary tubes, the refrigerant flows densely into a lower side. As a result, the refrigerant is densely collected in the dense part 122 and is then supplied to the condenser 110 through the collection line 112.

The length l1 of a first end 120a of the dense part 122 to which the refrigerant is supplied from the condenser 110 is smaller than the length l2 of a second end 120b of the dense part 122 from which the refrigerant is discharged to the condenser 110. The top and bottom sides of the wick 121 are approximately flat so that the bottom side of the first end 120a is higher than the bottom side of the second end 120b. Therefore, the refrigerant flows to the second end 120b and is easily collected to the condenser 110 through the collection line 112 connected to the second end 120b.

As described above, the refrigerant is transferred from the dense part 122 to the condenser 110 by capillary action. That is, in the secondary battery 100 of the current embodiment, the refrigerant can be circulated by capillary action without requiring a supply of power.

In addition, a check valve 123 is disposed between the dense part 122 of the evaporator 120 and collection line 112 so that the evaporated refrigerant may not flow reversely to the evaporator 120.

In addition, the amount of the evaporated refrigerant stored in the wick 121 of the evaporator 120 is varied according to the amount of heat generating from battery cells 11 of the battery pack 10. That is, as the amount of heat generating from the battery cells 11 increases, a greater amount of the evaporated refrigerant is stored in the wick 121. Thus, a greater amount of the evaporated refrigerant is transferred from the wick 121 to the dense part 122. Thus, the battery cells 11 may be cooled according to the amount of heat generating from the battery cells 11 by using the evaporator 120. That is, heat of the battery cells 11 can be uniformly dissipated.

In other words, the evaporator 120 extends along a bottom portion of the battery cells 11 in a first direction and the first port 111a and the second port 112a are spaced apart along the evaporator in the first direction. The evaporator 120 extends in a second direction, orthogonal to the first direction, and is longer in the second direction adjacent the second port 112a than the first port 111a. Thus, a bottom surface 120c of the evaporator, opposite the battery cells 11, is inclined relative to a top surface 120d adjacent the battery cells 11. However, a bottom surface of the wick 121 is parallel to an upper surface wick, i.e., the wick 121 has a substantially uniform width.

As described above, the secondary battery 100 of the current embodiment includes the wick 121 made of a porous medium at the lower side of the battery cells 11, and a refrigerant is circulated by the capillary action of the wick 121, so that the battery cells 11 can be easily cooled without requiring a supply of power. Furthermore, in the secondary battery 100 of the current embodiment, the amount of evaporated refrigerant stored in the wick 121 is varied in proportion to the amount of heat generating from the battery cells 11, so that the battery cells 11 can be uniformly cooled.

Hereinafter, a structure of a secondary battery will be described according to another embodiment.

Figure 2:
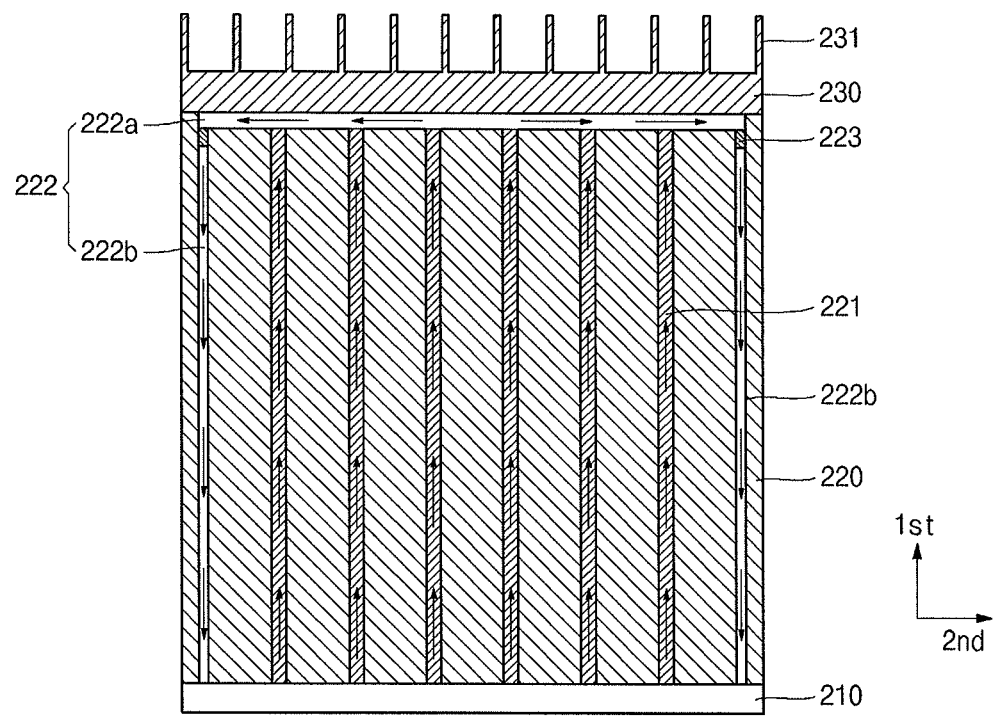
FIG. 2 illustrates a front view of a secondary battery according to another embodiment.
Figure 3:
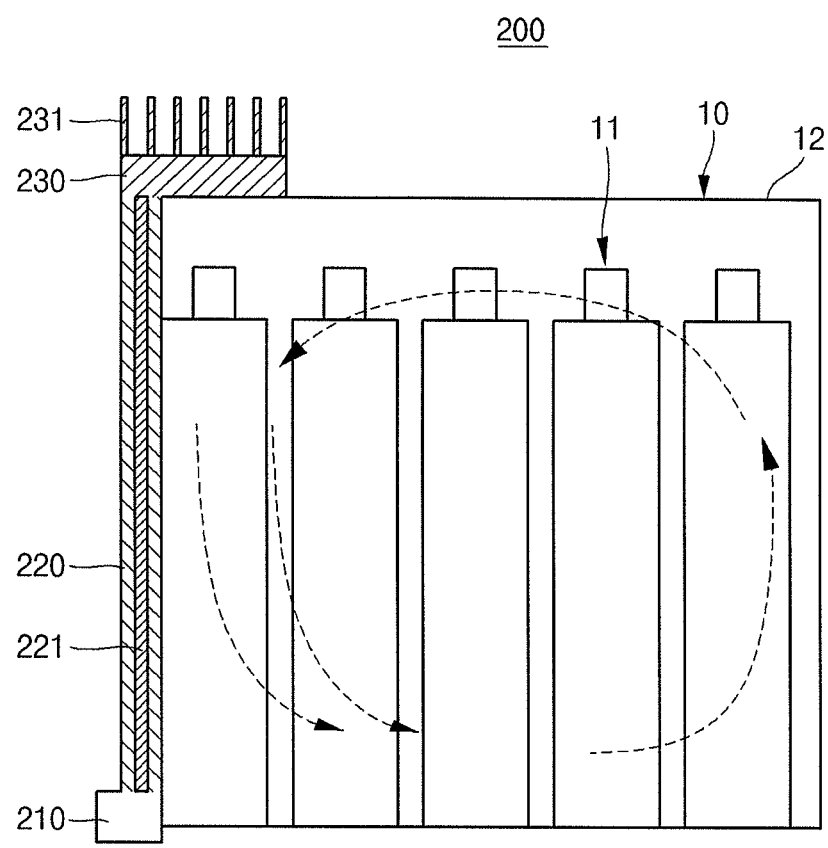
FIG. 3 illustrates a side view of the secondary battery according to the other embodiment.

FIG. 2 is a front view illustrating a secondary battery 200 according to another embodiment. FIG. 3 is a side view illustrating the secondary battery 200 according to the other embodiment. Elements having the same structures and functions as those of the elements of the previous embodiment are denoted by the same reference numerals, and the differences will be mainly described.

Referring to FIGS. 2 and 3, the secondary battery 200 of the current embodiment includes a storage part 210 disposed at a lower side of one surface of a battery pack 10, an evaporator 220 connected to an upper part of the storage part 210 and attached to the surface of the battery pack 10, and a heat sink 230 disposed on a top side of the evaporator 220.

The storage part 210 is disposed at a lower side of one surface of the battery pack 10. The storage part 210 includes an inner space for storing a refrigerant. The refrigerant may be pure water. The storage part 210 supplies the refrigerant to the evaporator 220 for cooling the battery pack 10.

The evaporator 220 is connected to an upper part of the storage part 210 and attached to the surface of the battery pack 10. For example, the evaporator 220 may be coupled to a housing 12 of the battery pack 10 which surrounds battery cells 11 of the battery pack 10. Therefore, the evaporator 220 may dissipate heat from the housing 12 to cool the battery cells 11 disposed in the housing 12.

The evaporator 220 includes a collector 222 and a plurality of wicks 221. The plurality of wicks are made of porous media coupled to the storage part 210 and extending in the length direction of the evaporator 220, i.e., along a first direction. The collector 222 receives the refrigerant from the wicks 221 and returns the refrigerant to the storage part 210.

The collector 222 may include a collection region 222a adjacent at least one side of the evaporator 220, e.g., a top of the evaporator 220. The collection region 222a receives the refrigerant from the wicks 221 and may extend along a second direction, orthogonal to the first direction. When the collection region is adjacent the top of the evaporator 220, the collector 222 may also include hollow conduits 222b returning the refrigerant to the storage part 210 and extending along the first direction.

The wicks 221 are formed of porous media for moving a refrigerant upward from the storage part 210 by capillary action as shown by arrows of FIG. 2. Therefore, the refrigerant flows upward along a surface of the housing 12. The wicks 221 may be disposed at the center part of the evaporator 220 so as to easily absorb heat generating from battery cells 11 disposed at the center part of the housing 12. The refrigerant is evaporated by heat transferred from the housing 12, and the evaporated refrigerant flows in the wicks 221.

Then, if the refrigerant is cooled by the heat sink 230 and is condensed, the condensed refrigerant flows downward along the collection conduits 222 as shown by arrows of FIG. 2. In this way, the refrigerant is collected again in the storage part 210. Check valves 223 are disposed at the collection conduits 222 to prevent reverse flows of the refrigerant to the wicks 221.

The heat sink 230 is disposed at the top side of the evaporator 220. The heat sink 230 cools the refrigerant transferred from the wicks 221 by capillary action. For example, dissipation fins 231 protruding upward from the heat sink 230 may make contact with air and exchange heat with the air, and by this, the refrigerant may be cooled.

The surface of the housing 12 to which the evaporator 220 is attached is cooled by the circulation of the refrigerant. Therefore, convectional air flows are generated in the housing 12 as shown by arrows of FIG. 3. Therefore, the battery cells 11 disposed in the housing 12 can be easily cooled by heat exchange with the convectional air flows. To generate smooth convectional air flows in the housing 12, the battery cells 11 may be spaced apart from each other in the housing 12 and arranged in parallel with the evaporator 220.

As described above, in the secondary battery 200 of the current embodiment, the refrigerant flows upward along the wicks 221 of the evaporator 220 from the storage part 210 disposed on at least one surface of the housing 12 of the battery pack 10 by the capillary action of the wicks 221, and then the refrigerant flows downward along the collection conduits 222. Therefore, convectional air flows can be generated in the housing 12 without requiring a supply of power, and thus the battery cells 11 disposed in the housing 12 can be easily and efficiently cooled. Furthermore, in the secondary battery 100 of the current embodiment, the degree of capillary action is varied according to the amount of heat generating in the battery cells 11, and thus the battery cells 11 can be uniformly cooled.

By way of summation and review, in accordance with embodiments, by providing an evaporator, including porous media and a collector in communication with the porous media, and a coolant storage unit in incoming and outgoing fluid communication with the evaporator, the evaporator being adjacent at least one battery cells, battery cells in a secondary battery can be uniformly cooled, thereby increasing the efficiency and lifespan of the secondary battery.

As described above, according to the embodiments, the secondary battery includes the wick made of a porous medium and disposed at the lower side of the battery cells, and a refrigerant is circulated by the capillary action of the wick, so that the battery cells can be easily cooled without requiring a supply of power.

Furthermore, in the secondary battery of the embodiments, the amount of evaporated refrigerant stored in the wick is varied in proportion to the amount of heat generated from the battery cells, so that the battery cells can be uniformly cooled. Therefore, convectional air flows can be generated in the housing without requiring a supply of power. Thus, the battery cells disposed in the housing can be efficiently and easily cooled.

Exemplary embodiments of a secondary battery have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

| [DESCRIPTION OF THE SYMBOLS IN MAIN PORTIONS OF THE DRAWINGS] | |
| --- | --- |
| 100, 200; Secondary battery | 10; Battery pack |
| 11; Battery cell | 12; Housing |
| 110; Condenser | 120, 220; Evaporator |
| 121, 221; Wick | 210; Storage part |
| 230; Heat sink | 231; Dissipation fin |

What is claimed is:

1. A battery pack, comprising:
   at least one battery cell;
   an evaporator disposed adjacent the at least one battery cell in thermal communication therewith, the evaporator including:
   porous media,
   a collector in communication with the porous media,
   a first port at which the coolant is received, and
   a second port through which the coolant is discharged; and
   a coolant storage unit in incoming and outgoing fluid communication with the evaporator,
   wherein the collector is wider adjacent the second port than the first port.

2. The battery pack as claimed in claim 1, wherein the coolant storage unit is configured to store a liquid coolant to be supplied to the porous media and to receive coolant from the collector.

3. The battery pack as claimed in claim 1, wherein the evaporator is disposed adjacent at least one side of the battery pack.

4. The battery pack as claimed in claim 1, wherein the storage unit is a condenser.

5. The battery pack as claimed in claim 4, wherein:
   the evaporator extends along the bottom portion of the battery cell in a first direction,
   the first and second port are spaced apart along the evaporator in the first direction, and
   the evaporator extends in a second direction, orthogonal to the first direction, the evaporator being longer in the second direction adjacent the second port than the first port.

6. The battery pack as claimed in claim 5, wherein the porous media extends substantially a same length in the second direction along the first direction.

7. The battery pack as claimed in claim 5, wherein the collector is further downward in the second direction adjacent the second port than adjacent the first port.

8. The battery pack as claimed in claim 5, further comprising:
   a collection line providing fluid communication from the second port to the condenser; and
   a supply line providing fluid communication from the condenser to the first port.

9. The battery pack as claimed in claim 8, wherein a diameter (d2) of the collection line is larger than a diameter (d1) of the supply line.

10. The battery pack as claimed in claim 9, wherein the diameter (d2) of the collection line is between 1.5 to 2 times the diameter (d1) of the supply line.

11. The battery pack as claimed in claim 9, further comprising a check valve between the second port and the collection line.

12. The battery pack as claimed in claim 5, wherein the collector is at a low pressure relative to the condenser.

13. The battery pack as claimed in claim 1, further comprising:
a housing for the battery cell, wherein the evaporator is disposed on at least one side of the housing and extends along the housing in a first direction.

14. The battery pack as claimed in claim 13, wherein:
the collector includes a collection region adjacent at least one side of the evaporator,
the storage unit is adjacent a bottom of the evaporator, and
the porous media extends along the evaporator in the first direction between the storage unit and the collector.

15. The battery pack as claimed in claim 14, further comprising a heat sink adjacent at least one side of the evaporator.

16. The battery pack as claimed in claim 15, wherein the heat sink includes dissipating fins extending away from the evaporator.

17. The battery pack as claimed in claim 14, wherein the collection region is adjacent a top of the evaporator and the collector includes a hollow conduit extending parallel with the porous media, the hollow conduit being in fluid communication with the storage unit and the collection region.

18. The battery pack as claimed in claim 17, wherein the hollow conduit is at a periphery of the evaporator in a second direction, orthogonal to the first direction.

19. The battery pack as claimed in claim 17, wherein the collector includes a check valve between the hollow conduit and the collection region.

* * * * *